(12) United States Patent
Sun et al.

(10) Patent No.: US 10,711,207 B2
(45) Date of Patent: Jul. 14, 2020

(54) INTEGRATED HYDROTREATING AND SLURRY HYDROCRACKING PROCESS

(71) Applicant: UOP LLC, Des Plaines, IL (US)

(72) Inventors: Ping Sun, Riverside, IL (US); John A. Petri, Wauconda, IL (US)

(73) Assignee: UOP LLC, Des Plaines, IL (US)

( * ) Notice: Subject to any disclaimer, the term of this patent is extended or adjusted under 35 U.S.C. 154(b) by 100 days.

(21) Appl. No.: 14/521,286

(22) Filed: Oct. 22, 2014

(65) Prior Publication Data

US 2016/0115400 A1 Apr. 28, 2016

(51) Int. Cl.
*C10G 65/12* (2006.01)
*C10G 47/26* (2006.01)
*B01J 8/22* (2006.01)

(52) U.S. Cl.
CPC .............. *C10G 65/12* (2013.01); *B01J 8/22* (2013.01); *C10G 47/26* (2013.01); *B01J 2208/00796* (2013.01)

(58) Field of Classification Search
CPC .................. C10G 65/12; C10G 65/02
See application file for complete search history.

(56) References Cited

U.S. PATENT DOCUMENTS

| | | | | |
|---|---|---|---|---|
| 3,272,734 A * | 9/1966 | MacLaren | ............... | C10G 47/18 208/110 |
| 3,445,377 A * | 5/1969 | Steenberg | ............... | C10G 65/12 208/58 |
| 3,540,999 A * | 11/1970 | Jacobs | ................... | C10G 65/12 208/15 |
| 3,684,694 A * | 8/1972 | Hanson et al. | ........ | C10G 65/12 208/57 |
| 4,120,778 A | 10/1978 | Goudriaan et al. | | |
| 5,037,532 A * | 8/1991 | Winter, Jr. | ............. | C10G 45/46 208/143 |
| 5,382,349 A | 1/1995 | Yoshita et al. | | |
| 5,474,977 A | 12/1995 | Gatsis | | |
| 5,755,955 A | 5/1998 | Benham et al. | | |
| 6,179,995 B1 | 1/2001 | Cash et al. | | |
| 6,342,152 B1 * | 1/2002 | Yoshita | ................... | C10G 65/12 208/108 |
| 7,803,334 B1 | 9/2010 | Hoehn et al. | | |
| 8,696,888 B2 | 4/2014 | Keusenkothen et al. | | |
| 2009/0057195 A1 * | 3/2009 | Powers | ................ | C10G 21/003 208/59 |
| 2010/0193400 A1 | 8/2010 | Kim et al. | | |

(Continued)

FOREIGN PATENT DOCUMENTS

CN 101089137 A 12/2007

*Primary Examiner* — Michelle Stein
(74) *Attorney, Agent, or Firm* — Paschall & Associates, LLC; James C. Paschall (57) ABSTRACT

Slurry hydrocracking processes are described. The methods include hydrotreating a heavy residual hydrocarbon feed in a hydrotreating zone under residual hydrotreating conditions to form a hydrotreated effluent. The hydrotreated effluent is separated in an first separator to form an overhead vapor stream and a bottoms stream. The bottoms stream is hydrocracked in a slurry hydrocracking zone under slurry hydrocracking conditions. The effluent from the slurry hydrocracking zone is fractionated in a fractionation zone into at least two streams. Slurry hydrocracking apparatus is also described.

19 Claims, 2 Drawing Sheets

(56) References Cited

U.S. PATENT DOCUMENTS

| | | | |
|---|---|---|---|
| 2011/0083997 A1 | 4/2011 | Silva et al. | |
| 2011/0303580 A1* | 12/2011 | Haizmann | C10G 47/26 |
| | | | 208/40 |
| 2012/0234726 A1* | 9/2012 | Morel | B01J 27/30 |
| | | | 208/49 |
| 2015/0027924 A1* | 1/2015 | Gupta | C10G 65/02 |
| | | | 208/49 |

* cited by examiner

INTEGRATED HYDROTREATING AND SLURRY HYDROCRACKING PROCESS

BACKGROUND OF THE INVENTION

Slurry hydrocracking (SHC) is used for the upgrading of heavy hydrocarbon feedstocks. In SHC, these feedstocks are converted in the presence of hydrogen and solid catalyst particles (e.g., as a particulate metallic compound such as a metal sulfide) in a slurry phase. Representative slurry hydrocracking processes are described, for example, in U.S. Pat. No. 5,755,955 and U.S. Pat. No. 5,474,977.

Desirably, SHC would run at about 90% conversion of 524+° C. (975+° F.) hydrocarbons or higher. Higher conversion is always preferred with higher product yield and less residue left unconverted. However, higher conversion levels in SHC are always obtained at the expense of a greater risk of precipitating asphaltenes present in the heavy hydrocarbon feedstock coke precursors or coke. Although coke formation can be controlled using a catalyst with higher activity, higher catalyst loading, higher reactor pressure, or lower reactor temperature, frequently the coke formation reaction under SHC conditions is not controlled effectively by applying one or a combination of these methodologies for both technical and economic reasons.

Frequently, SHC involves the use of less expensive catalyst, or a lower dosage when using a more expensive catalyst, which would preferably be in unsupported metal form. Asphaltene conversion in SHC is therefore frequently found to be limited by the effectiveness of the catalyst applied under SHC conditions. Ebullated bed hydrocracking (EBHC) is also used to upgrade heavy hydrocarbon feed often using more active catalyst, e.g., a mixture of at least one Group VIII metal (preferably cobalt and/or nickel) and at least one Group VI metal (preferably molybdenum and/or tungsten) on a high surface area support material, preferably alumina. The higher activity catalyst in EBHC allows for effective hydrogenation of the feed at a lower severity; however, EBHC conversion is limited due to the intrinsically high fouling propensity when high conversion is pursued in a single step.

Therefore, there is a need for a process in which heavy hydrocarbons are converted or upgraded with improved efficiency and conversion.

SUMMARY OF THE INVENTION

One aspect of the invention is a slurry hydrocracking process. In one embodiment, the process includes hydrotreating a heavy residual hydrocarbon feed in a hydrotreating zone under hydrotreating conditions to form a hydrotreated effluent. The hydrotreated effluent is separated in a first separator to form an overhead vapor stream and a bottoms liquid stream. The bottoms liquid stream is hydrocracked in a slurry hydrocracking zone under slurry hydrocracking conditions. At least a portion of the effluent from the slurry hydrocracking zone is fractionated in a fractionation zone into at least two streams.

Another aspect of the invention is a slurry hydrocracking apparatus. In one embodiment, the apparatus includes a hydrotreating zone having a feed inlet and an outlet; a separator having an inlet in fluid communication with the outlet of the hydrotreating zone, an overhead outlet and a bottoms outlet; a slurry bubble column having an inlet in fluid communication with the bottoms outlet of the separator and an outlet; and a fractionation zone having an inlet in fluid communication with the outlet of the slurry bubble column, and at least two outlets.

DETAILED DESCRIPTION OF THE INVENTION

The present invention provides a process for converting heavy hydrocarbons which integrates a hydrotreating zone with the SHC process. The heavy hydrocarbon feed is pre-treated in the hydrotreating zone before being processed in the SHC zone. The process can be used to increase conversion in the SHC process. Alternatively, it allows the operator to reduce the amount of coke precursors at a given conversion compared with the SHC process alone.

The hydrotreating zone operates at much lower hydrocracking severity than the SHC zone. The hydrotreating catalyst has much higher hydrogenation activity than the SHC catalyst, converting asphaltene material in the feed and enriching the hydrogen content in a greater efficiency before entering the SHC zone. The hydrotreated feed is sent to the SHC zone for slurry hydrocracking.

The process can achieve an overall conversion of at least about 90% on a weight fraction basis without severe coking occurring, or at least about 93%, or at least about 94%, or at least about 95%, or at least about 96%, or at least about 97%. Overall conversion is the net disappearance of the 524+° C. (975+° F.) hydrocarbons as measured from the net effluent streams of the fractionation zone. The net effluent products from the fractionation zone represent the sum of the net reactor effluents from both the hydrotreating zone and SHC reaction zones. Standard gas chromatograph (GC) methods that measure the true boiling point distribution of the heavy hydrocarbon feedstock and the fractionator zone net effluent streams, such as ASTM D2887 and ASTM D6352, can be used in combination with the fractionator zone net effluent stream rates to determine the overall conversion. The standard GC method is applied to the heavy hydrocarbon feedstock to determine the mass fraction of hydrocarbon boiling above 524+° C. (975° F.+) in this stream. The mass rate of 524+° C. (975° F.+) in the heavy hydrocarbon feedstock is the mass rate of the heavy hydrocarbon feedstock multiplied by the fraction of 524+° C. (975° F.+) hydrocarbon. The standard GC method is applied to all net effluent streams from the fractionation zone to determine the mass fraction of hydrocarbons boiling above 524+° C. (975° F.+) in each stream. The mass rate of 524+° C. (975° F.+) hydrocarbons from the fractionator zone is determined by summing for all fractionator net effluent streams the mass rate of each stream multiplied by the fraction of 524+° C. (975° F.+) fraction in each stream. The conversion in mass percent can be determined by multiplying 100 times (1—mass rate of 524+° C. (975° F.+) hydrocarbon from the fractionation zone divided by the mass rate the 524+° C. (975° F.+) in the heavy hydrocarbon feedstock).

In comparison with a conventional SHC process, the hydrotreated effluent from hydrotreating zone provides a feed into the SHC process with less metal, asphaltene, Conradson carbon residue, nitrogen, sulfur and/or oxygen.

As a result, the SHC products and side products all contain less organic sulfur, organic nitrogen, metal content with more aromatic saturation and are more easily processed in downstream hydroprocessing units. For example, the resulting pitch that has a normal boiling point 524+° C. (975+° F.) might only contain iron from the SHC reaction zone catalyst with only trace amount of vanadium and nickel that are common metal contaminants in vacuum residue, which would be beneficial for downstream processes such as gasification and combustion. In another embodiment, if other metals such as nickel or molybdenum that are catalysts for the slurry hydrocracking process, these metals can be recovered without contamination of other metals from the heavy hydrocarbon feedstock such as vanadium, silicon, alkali and alkaline earth metals, and the like. The metals that are used as catalysts for the slurry hydrocracking, such as iron, nickel, molybdenum and the like, can be recovered more effectively and recycled.

The majority of the metals in the heavy hydrocarbon feedstock such as nickel, vanadium, silicon, alkali and alkaline earth metals and the like will be retained in the hydrotreating zone on the hydrotreating catalyst.

Other contaminants in the heavy hydrocarbon feed, for example, sulfur, nitrogen and oxygen, are partially converted in the hydrotreating zone to gaseous side products such as hydrogen sulfide, ammonia, and water.

Coke formation in the SHC zone is generally related to the asphaltene content in the SHC feed. As the asphaltene content increases, the amount of coke produced generally increases as well at comparable reactor conditions and conversions. Coke formation is related to increasing insolubility of the asphaltene while high conversion is sought. The insolubility limit is directly linked with the amount and the type of asphaltene.

During an SHC reaction, it is important to minimize coke formation. It has been shown by the model of Pfeiffer and Saal, PHYS. CHEM. 44, 139 (1940), that asphaltenes are surrounded by a layer of resins, or polar aromatics which stabilize them in colloidal suspension. In the absence of polar aromatics, or if polar aromatics are diluted by paraffinic molecules or are converted to lighter paraffinic and aromatic materials, these asphaltenes can self-associate, or flocculate to form larger molecules with poor solubility and precipitate out of solution to form coke. In many occasions, a second liquid phase may form prior to coke formation, e.g. through a mesophasic material. This phenomena is generally described as a mesophase, e.g., a second liquid phase with semi-crystalline carbonaceous material detectable under polarized light microscopy.

Product solubility in an organic solvent, e.g., toluene, can be generally applied as a way to measure the amount of carbonaceous solids formed in a SHC reactor. The solids not dissolved by an excessive toluene test include inorganic catalyst and toluene insoluble organic residue (TIOR). TIOR in a SHC product can be used as a coke formation measurement which includes any coke or coke precursors. A coke or coke precursor generally features higher molecular weight and higher solubility parameters, e.g., lower solubility in a SHC product solution. The amount of TIOR can serve as a warning that operating conditions are too severe in an SHC zone and that coke formation is likely to occur under prevailing conditions.

Hydrotreating a heavy hydrocarbon feedstock such as atmospheric and vacuum residue can achieve a significant reduction in asphaltene and a more saturated SHC feed structure, resulting in reduced coking during further processing. Hydrotreatment in the hydrotreating zone performs hydrogenation of multi-ring aromatics that would otherwise lead to coke formation. In addition, hydroaromatics produced out of asphaltene conversion may aid in hydrogen transfer as in solvent-assisted direct coal hydrogenation. Hydrotreating atmospheric and vacuum residue can also reduce the residue content, such as the 524+° C. (975+° F.) hydrocarbons. In the hydrotreating zone, about 5-40 wt % conversion can be achieved. The converted product is recovered by a separator as a vapor stream, and the separator bottom is sent to downstream SHC zone. As a result, a lower feed rate is sent to a smaller SHC zone. With lower feed rate to SHC, a higher combined feed ratio (CFR) on the SHC zone can be achieved when VGO is recycled to the SHC zone to add stability to the SHC reactor, as exemplified by U.S. Pat. No. 5,755,955. For example, a CFR of 1.0 would indicate no recycled oil. A CFR of 2.0 would indicate that the recycled oil rate through a reactor would be the same as the feed rate. A higher combined feed ratio decreases the conversion over a reactor on a reactor charge basis. Lower conversion per pass has economic benefits, such as increasing the distillate yield and decreasing the light ends production.

The coke formation can be measured by the mass of product that is insoluble in a toluene wash procedure. The amount of coke produced can be reduced significantly relative to the process without the hydrotreating pre-treatment at a same overall conversion basis, for example, at least about 10%, or at least about 20%, or at least about 30%, or at least about 40%, or at least about 50%.

The inventive process can allow a reduction in the SHC reactor volume relative to a conventional SHC process configuration. The 524+° C. (975° F.+) conversion from the hydrotreating zone and downstream hot flash of the hydrotreating zone effluent reduces the feed rate to the SHC zone. The removal of asphaltenes and the hydrogenation of the feed to the SHC zone reduces the coking propensity of the feed. With reduced flow to the SHC zone and the same size reactor and target conversion as a process configuration without the hydrotreating zone, the residence time will be longer, which would allow a lower reactor temperature in the SHC zone. In some embodiments, the invention can also allow the SHC zone to be run with increased severity, for example, at increased temperature or a higher liquid hourly space velocity, with a similar amount of coke formation.

Another benefit of the integrated hydrotreating zone and SHC zone is that higher consumption of hydrogen in the integrated system will reduce the downstream hydroprocessing chemical hydrogen consumption requirements for the distillate and gas oil produced.

Figure 1:
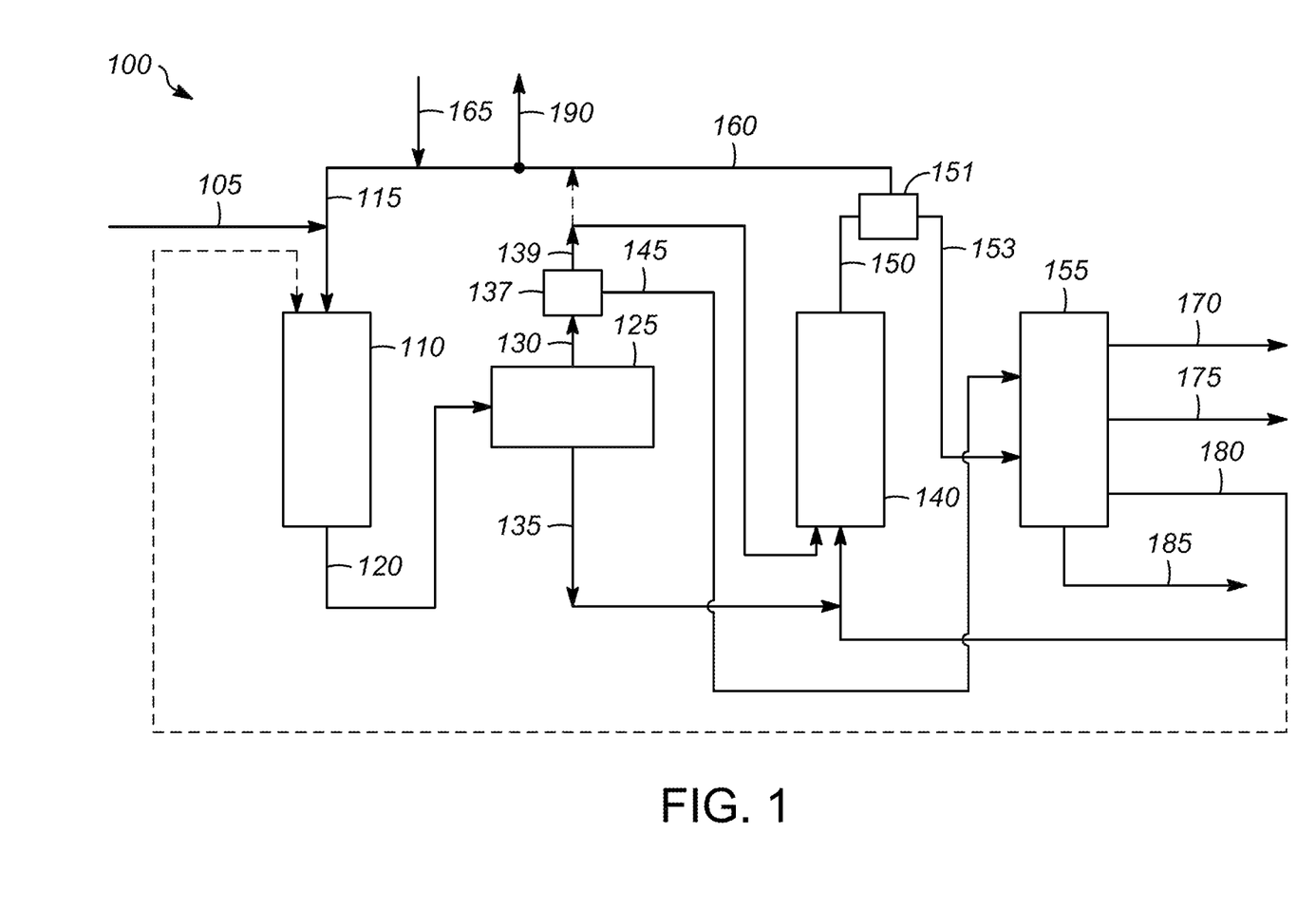
FIG. 1 illustrates one embodiment of a process of the present invention.

FIG. 1 illustrates one embodiment of the SHC process 100. The heavy hydrocarbon feed 105 is sent to the hydrotreating zone 110 along with hydrogen stream 115.

The heavy hydrocarbon feedstock to the process often comprises a vacuum column residue or an atmospheric column residue. Other representative components, as fresh hydrocarbon feeds, that may be included in the heavy hydrocarbon feedstock include gas oils, such as straight-run gas oils (e.g., vacuum gas oil), recovered by fractional distillation of crude petroleum. Other gas oils produced in refineries include coker gas oil and visbreaker gas oil. In the case of a straight-run vacuum gas oil, the distillation end point is governed by the crude oil vacuum fractionation column and particularly the fractionation temperature cutoff between the vacuum gas oil and vacuum column bottoms split. Thus, refinery gas oil components suitable as fresh hydrocarbon feed components of the heavy hydrocarbon feedstock to the SHC reactor, such as straight-run fractions, often result from crude oil fractionation or distillation operations, while other gas oil components are obtained following one or more hydrocarbon conversion reactions. Whether or not these gas oils are present, the combined heavy hydrocarbon feedstock to the SHC reaction zone can be a mixture of hydrocarbons (i) boiling predominantly in a representative crude oil vacuum column residue range, for example above about 524+° C. (975+° F.), and (ii) hydrocarbons boiling in a representative gas oil range, for example from about 343° C. (650° F.) to an end point of about 593° C. (1100° F.), with other representative distillation end points being about 566° C. (1050° F.), about 538° C. (1000° F.), and about 482° C. (900° F.). In this case, components (i) and (ii) of the heavy hydrocarbon feedstock are therefore representative of a crude oil vacuum column residue and an asphalt product from a solvent deasphalting unit, respectively.

Additional components of the heavy hydrocarbon feedstock can include residual oils such as a crude oil vacuum distillation column residuum boiling above 566° C. (1050° F.), tars, bitumen, coal oils, deasphalted oils from a solvent deasphalting process and shale oils. Other asphaltene-containing materials such as whole or topped petroleum crude oils including heavy crude oils may also be used as components processed by SHC. In addition to asphaltenes, these further possible components of the heavy hydrocarbon feedstock, as well as others, generally also contain significant metallic contaminants (e.g., nickel, iron, silicon, vanadium, alkali and alkaline earth metals and the like), a high content of organic sulfur and nitrogen compounds, and a high concentration of Conradson carbon residue. The metals content of such components, for example, may be 100 ppm to 1,000 ppm by weight, the total sulfur content may range from 1% to 7% by weight, and the API gravity may range from about −5° to about 35°. The Conradson carbon residue of such components is generally at least about 5%, and is often from about 10% to about 35% by weight.

The term "hydrotreating" as used herein refers to processes wherein a hydrogen-containing treat gas is used in the presence of suitable catalysts which are primarily active for the removal of heteroatoms, such as sulfur and nitrogen and for hydrogenation of aromatics. Suitable hydrotreating catalysts for use in the present invention are any known conventional hydrotreating catalysts and include those which are comprised of at least one Group VIII metal, preferably cobalt and nickel, more preferably cobalt and/or nickel and at least one Group VI metal, preferably molybdenum and tungsten, on a high surface area support material, preferably alumina Other suitable hydrotreating catalysts include zeolitic catalysts, as well as noble metal catalysts where the noble metal is selected from palladium and platinum. Often a fixed bed reactor is used with the feed and hydrogen fed from the top of the reactor. It is within the scope of the present invention that more than one type of hydrotreating catalyst be used in the same reaction vessel or a series of reaction vessels, effectively performing a series of reactions of hydrodemetallization, hydrodesulfurization, hydrodenitrogenition, hydrodeasphaltenization and/or hydrodearomatization. The Group VIII metal is typically present in an amount ranging from about 2 to about 20 weight percent, preferably from about 4 to about 12 weight percent. The Group VI metal will typically be present in an amount ranging from about 1 to about 25 weight percent, preferably from about 2 to about 25 weight percent.

Typical hydrotreating temperatures range from about 204° C. (400° F.) to about 482° C. (900° F.), or about 330° C. (626° F.) to about 440° C. (824° F.), with pressures from about 3.6 MPa (500 psig) to about 20 MPa (2900 psig), or about 13 MPa (1885 psig) to about 28 MPa (4000 psig), and a liquid hourly space velocity of about 0.1 $hr^{-1}$ to about 2 $hr^{-1}$, and a gas to oil ratio of 4,000-10,000 SCFB.

The goal of the hydrotreating is to remove the coke precursors, e.g., indicated by the toluene insolubles, as well as substantially removing metals and performing aromatic saturation of multi-ring aromatics to help downstream processing in the SHC zone. A partial conversion is also achieved. A range of severity can be selected. For example, a partial conversion of 524+° C. (975+° F.) hydrocarbons of 20% to 50% can be targeted depending on the feed and the hydrotreating catalyst cycle life. An optimal hydrotreating severity economically balances the hydrotreating zone catalyst volume with the hydrotreating severity for contaminants removal, saturation and conversion and with the desired hydrotreating catalyst cycle length.

The hydrotreated effluent 120 is separated in a first separator. There can be one or more separators in the first separator; for example, there could be a hot separator 125 followed by a cold separator 137, as shown. As illustrated, the hydrotreated effluent 120 is sent to a hot separator 125 where it is separated into an overhead stream 130 and a bottoms liquid stream 135. The hot separator 125 is operated at a temperature in the range of about 232° C. (450° F.) to about 399° C. (750° F.), or about 232° C. (450° F.) to about 371° C. (700° F.), or about 232° C. (450° F.) to about 315° C. (650° F.), or about 371° C. (700° F.), or about 399° C. (750° F.) and a pressure in a range of about the pressure of the hydrotreating zone.

The overhead stream 130 is sent to a cold separator 137 where it is separated into a cold separator overhead stream 139 and a cold separator bottoms liquid stream 145. The cold separator 137 is operated at a temperature in the range of about 20° C. (68° F.) to about 149° C. (300° F.), or about 232° C. (450° F.) and a pressure in a range of about the pressure of the hot separator.

The cold separator overhead stream 139 comprises a hydrogen rich gas stream containing hydrogen sulfide, ammonia, and a portion of light end hydrocarbon product. The cold separator overhead stream 139 is sent to the SHC zone 140 to supply the hydrogen requirement for the slurry hydrocracking reactions so that the gas is run in series from the hydrotreating zone 110 to the SHC zone 140. In another embodiment, a fraction of the cold separator overhead stream 139 is sent back to the hydrotreating zone 110.

The cold separator bottoms liquid stream 145 contains converted hydrocarbons boiling substantially below 524° C. (975° F.) and comprises hydrocarbon components boiling in the naphtha, distillate, and vacuum gas oil (VGO) boiling range. These hydrocarbon components will have a true boiling point range nominally between about 10° C. (50° F.) and about 538° C. (1000° F.). The cold separator bottoms liquid stream 145 is sent to fractionation zone 155.

The hot separator bottoms liquid stream 135 comprises the hydrotreated heavy hydrocarbon feed with a true boiling point boiling range substantially above about 524° C. (975° F.). Recycled oil from the fractionation zone may be present in the bottoms stream if the recycled oil is recycled through the hydrotreating zone 110.

The hot separator bottoms liquid stream 135 is heated, for example, in one of more of a fired heater, a heat exchanger, or other types of heaters (not shown), and sent to the SHC zone 140.

A slurry formed with the heavy hydrocarbon feedstock is normally passed upwardly through the SHC zone 140, with the slurry generally having a solid particulate content in the range from about 0.01% to about 10% by weight. The solid particulate is generally a compound of a catalytically active metal, typically a metal sulfide, either alone or supported on a refractory material such as an inorganic metal oxide (e.g., alumina, silica, titania, zirconia, and mixtures thereof). Other suitable refractory materials include carbon, coal, and clays. The solid particulate alone or supported has an ability to act as a "coke getter" or adsorbent of asphaltene precursors that have a tendency to foul process equipment upon precipitation.

Catalytically active metals for use in SHC include those from Group IVB, Group VB, Group VIB, Group VIIB, or Group VIII of the Periodic Table, which are incorporated in the heavy hydrocarbon feedstock in amounts effective for catalyzing desired hydrotreating and/or hydrocracking reactions to provide, for example, lower boiling hydrocarbons that may be fractionated from the SHC effluent as naphtha and/or distillate. Representative metals include iron, nickel, molybdenum, vanadium, tungsten, cobalt, ruthenium, and mixtures thereof. The catalytically active metal may be present as a solid particulate in elemental form or as an organic compound or an inorganic compound such as a sulfide (e.g., iron sulfide) or other ionic compound. Metal or metal compound nanoaggregates may also be used to form the solid particulates.

In some embodiments, the metal compounds can be formed in situ, as solid particulates, from a catalyst precursor such as a metal sulfate (e.g., iron sulfate monohydrate) that decomposes or reacts in the SHC reaction zone environment, to form a desired, well-dispersed and catalytically active solid particulate (e.g., as a form of iron sulfide). Precursors also include oil-soluble organometallic compounds containing the catalytically active metal of interest that thermally decompose to form the solid particulate (e.g., a form of iron sulfide) having catalytic activity. Such compounds are generally highly dispersible in the heavy hydrocarbon feedstock and normally convert under pretreatment or SHC reaction zone conditions to the solid particulate that is contained in the slurry effluent. An exemplary in situ solid particulate preparation, involving pretreating the heavy hydrocarbon feedstock and precursors of the ultimately desired metal compound, is described, for example, in U.S. Pat. No. 5,474,977.

Other suitable precursors include metal oxides that may be converted to catalytically active (or more catalytically active) compounds such as metal sulfides. In a particular embodiment, a metal oxide containing mineral may be used as a precursor of a solid particulate comprising the catalytically active metal (e.g., a form of iron sulfide) on an inorganic refractory metal oxide support (e.g., alumina) Bauxite represents a particular precursor in which conversion of iron oxide crystals contained in this mineral provides an iron sulfide catalyst as a solid particulate, where the iron sulfide after conversion is supported on the alumina that is predominantly present in the bauxite precursor.

Conditions in the SHC zone 140 generally include a temperature from about 343° C. (650° F.) to about 538° C. (1000° F.), or about 432° C. (810° F.) to about 476° C. (890° F.), or about 446° C. (835° F.) to about 452° C. (845° F.), a pressure from about 3.5 MPa (500 psig) to about 25 MPa (3625 psig), or 10 MPa (1450 psig) to about 25 MPa (3625 psig), a space velocity from about 0.1 to about 10 volumes of heavy hydrocarbon feedstock per hour per volume of the SHC zone, a gas to oil feed ratio of 4,000-10,000 SCFB. The catalyst and conditions used in the SHC zone 140 are suitable for upgrading the heavy hydrocarbon feedstock to provide a lower boiling component, namely an SHC distillate fraction, in the SHC effluent 150 exiting the SHC zone 140.

The SHC effluent 150 is sent to a second separator 151 where it is separated into a hydrogen rich off gas stream 160 and a bottoms liquid stream 153. Similar to what was described above for the first separator, the second separator can include one or more separators, e.g., a hot separator operated at between about 260° C. (500° F.) and 426° C. (800° F.), and preferably at about the pressure of the SHC reactor and a cold separator operated between about 232° C. (450° F.) and 360° C. (680° F.), and a pressure of about the pressure of the hot separator. An intermediate warm separator may also be present between the hot separator and the cold separator.

The bottoms liquid stream 153 is sent to fractionation zone 155.

The hydrogen-rich offgas stream 160 can be combined with make-up hydrogen 165, and in some cases with a fraction of the cold separator overhead stream 139 to form the hydrogen stream 115 to the hydrotreating zone 110 and the SHC zone 140. In another embodiment stream 115 can also be directed also to the hydrotreating zone 110 and the SHC zone 140.

A portion 190 of the hydrogen-rich stream 160, optionally including a fraction of cold separator overhead stream 139, is sent as a purge stream that is introduced to a $H_2S$ scrubbing system (not shown) when being released to the ambient or refinery complex.

The bottoms liquid stream 153 can be separated in the fractionation zone 155 into two or more streams. For example, there can be a naphtha and diesel stream 170, which can be further processed, such as by hydrotreating. Another stream could be a light vacuum gas oil (LVGO) stream 175 which could be sent to a hydrocracking zone. There could be a heavy vacuum gas oil (HVGO) stream 180, which could be recycled to the SHC zone 140. In some embodiments, HVGO stream 180 can be also sent to hydrotreating zone 110 to enrich hydroaromatics content before it goes into SHC zone 140 as an enhanced hydrogen transfer medium. Pitch stream 185 could have several dispositions. Pitch can also be used directly as a fuel to a gasifier or a combustor, or a feed into cement kiln. In one embodiment, the SHC catalyst metals can be recovered from the pitch to produce a substantially metals free pitch and recovered metals. Substantially metals free pitch contains mostly hydrocarbons with only trace amount of metals or inorganic materials carried from heavy hydrocarbon feed and SHC catalyst, e.g., molybdenum, nickel, tungsten, cobalt, iron, silicon, vanadium, alkali and alkaline earth metals and the like. When iron, molybdenum, tungsten or cobalt are the SHC catalyst, the recovered metals contains mostly iron, molybdenum, tungsten or cobalt with trace amount of metals or inorganic materials carried from heavy hydrocarbon feed due to the retention of these on hydrotreating catalyst. The metals-free pitch can be blended into fuel oil or be used as an asphalt component. Other streams could be formed in the fractionation zone 155, as would be understood by this of skill in the art.

The fractionation zone 155 could include one or more distillation columns.

By "about" we mean within 10% of the value, or within 5%, or within 1%.

EXAMPLES

Example 1

Figure 2:
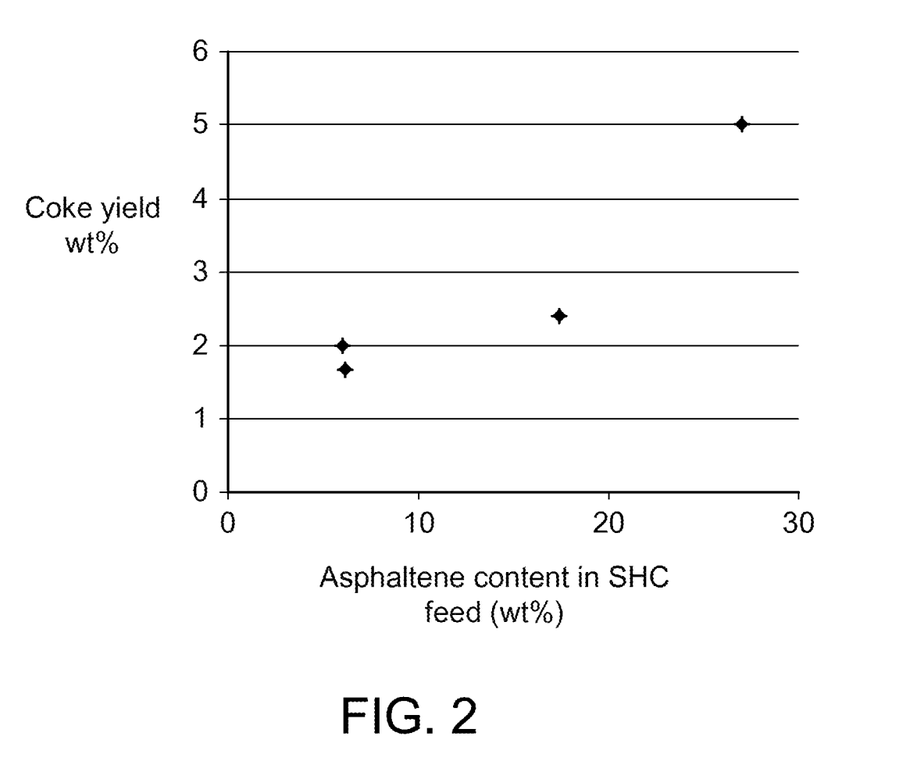
FIG. 2 is a graph showing the coke yield as the amount of solid free toluene insolubles relative to SHC feed in the slurry hydrocracking as a function of asphaltene content in slurry reactor feed.

Four feed stocks were screened at typical experimental conditions in a continuous SHC pilot plant. The four feedstocks are all vacuum residue (VR) geographically identified as East Europe Medium, Arabian Light, Arabian Heavy and Asia Heavy. The four feedstocks have asphaltene content as measured by n-heptane insolubles as 6, 6.1, 17.4 and 27 respectively for VR feed from East Europe Medium, Arabian Light, Arabian Heavy and Asia Heavy. A 2-liter CTSR based experimental apparatus was used for converting the feedstock at a standard condition, e.g., 446° C., 13.8 MPa, but with varying space velocity to reach a similar 524+° C. (975° F.+) conversion level which was 90% in this case. A commercial UOP catalyst, SHC-1 catalyst, was used with 2.5% wt loading in all the experiments. The coke yield was measured by the weight of solid free toluene insoluble relative to SHC feed weight measured during the same time duration of the experiment. The results are shown in FIG. 2. The East European Medium produced 1.9%, the Arabian Light produced 1.6%, the Arabian Heavy produced 2.3%, and the Asia Heavy produced 5% coke. FIG. 2 shows that as the asphaltene content in the feed increases, the amount of coke (as solid free toluene insoluble in the SHC reactor) formed increases.

Example 2

Two vacuum residues from Kuwait and Heavy Arabian Crude were hydrotreated in a fixed pilot plant reactor. A commercial R-11 catalyst was used in the experiments. The key feed analytical results and the product properties are summarized in Table 1. The results show the effectiveness of resid hydrotreating.

TABLE 1

|  | Kuwait VR | Arabian Heavy VR |
|---|---|---|
| Sulfur in Feed, wt % | 4.99 | 5.25 |
| Asphaltene in Feed, wt % | 15.3 | 24.1 |
| Ni, V in feed, wt % | 27, 96 | 48, 165 |
| CCR in feed, wt % | 17.7 | 21.7 |
| 10% in Feed, ° C. | 481 | 545 |
| 30% in Feed, ° C. | 575 | 593 |
| LHSV | 0.15 | 0.15 |
| Gas rate, SCFB | 6000 | 6000 |
| Temperature, ° C. | 387 | 397 |
| Pressure, MPa | 17.2 | 17.2 |
| Pilot plant results |  |  |
| 538° C.+ (1000° F.+) Conversion | 33 | 41.05 |
| Asphaltene in VR portion of product, wt % | 2.5 | 6.6 |
| Metal, Ni and V in VR portion of product, ppmw | 3.5, 2.3 | 13.9, 15.2 |
| CCR in VR portion of product | 10.2 | 14.4 |
| Sulfur in VR portion of product, ppmw | 8135 | 8945 |

Example 3

A 1-liter autovalve reactor was used to perform conversion of a vacuum residue from East Europe. The experimental details and results are shown in Table 2.

TABLE 2

|  | Test 1 reference | Test 2 | Test 3 |
|---|---|---|---|
| Feed type | East Europe VR | East Europe VR | liquid product of Hydrotreated East Europe VR |
| Feed asphaltene content (wt %) | 6.1 | 6.1 | 4.3 |
| Feed hydrogen content (wt %) | 10.2 | 10.2 | 11.5 |
| Pressure, MPa | 16.2 | 16.2 | 16.2 |
| Temperature, ° C. | 460 | 380 | 460 |
| Residence time (min) | 100 | 180 | 100 |
| Catalyst | UOP SHC-1 | UOP Residue HDT 1 | UOP SHC-1 |
| Catalyst loading (Feed/catalyst, wt/wt) | 22:1 | 9.2:1 | 22:1 |
| Experimental results |  |  |  |
| Conversion, incremental, wt | 88.7% | 26 | 96.4% |
| Overall conversion on VR basis, wt | 88.7% |  | 97.4% |
| Coke yield, on reactor charge basis, wt | 3.2% | n/a | 3.6% |
| Coke yield, on as fed VR basis, wt | 3.2% |  | 2.7% |

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A slurry hydrocracking process comprising:
   hydrotreating a fresh, heavy residual, asphaltene-containing hydrocarbon feed in a fixed bed reactor, hydrotreating zone under hydrotreating conditions effective to provide from about 20 to about 50 wt % conversion of 975+° F. hydrocarbons in the presence of a hydrotreating catalyst to hydrogenate multi-ring aromatics including asphaltenes and form a hydrotreated effluent, wherein the hydrotreating catalyst comprises at least one Group VIII metal selected from cobalt and nickel and at least one Group VI metal selected from molybdenum and tungsten on an alumina support;
   separating the hydrotreated effluent in a first separator to form an overhead vapor stream and a bottoms liquid stream, the first separator comprises at least a hot separator and a cold separator, and separating the hydrotreated effluent in the first separator to form the overhead vapor stream and the bottoms liquid stream comprises:

separating the hydrotreated effluent in a hot separator to form the overhead vapor stream and the bottoms liquid stream;
separating the overhead vapor stream from the hot separator into a cold separator overhead stream and a liquid stream in a cold separator; and
introducing at least a portion of the cold separator overhead stream into a slurry hydrocracking zone;
hydrocracking the bottoms liquid stream from the first separator in the slurry hydrocracking zone in the presence of a slurry hydrocracking catalyst under slurry hydrocracking conditions; and
fractionating at least a portion of the effluent from the slurry hydrocracking zone in a fractionation zone into at least two streams.

2. The method of claim 1 wherein the slurry hydrocracking conditions comprise a temperature of about 415° C. (780° F.) to about 482° C. (900° F.) and a pressure in a range of about 10 MPa to about 25 MPa.

3. The method of claim 1 wherein the hydrotreating conditions are selected from a temperature in a range of about 330° C. (626° F.) to about 440° C. (824° F.), further comprises a pressure of about 13 MPa to about 28 MPa, a liquid hourly space velocity of about 0.1 hr$^{-1}$ to about 2 hr$^{-1}$, and a gas to oil ratio of 4,000-10,000 SCFB, so that the hydrotreating net conversion is within the range of claim 1.

4. The method of claim 1 wherein an overall conversion 975+° F. hydrocarbons in the heavy residual, asphaltene-containing hydrocarbon feed is at least about 93%.

5. The method of claim 1 further comprising: introducing the liquid stream from the cold separator into the fractionation zone.

6. The method of claim 1 further comprising:
separating the effluent from the slurry hydrocracking zone into a hydrogen rich gas stream and a liquid stream in a second separator;
recycling at least a portion of the hydrogen rich gas stream to the hydrotreating zone; and
wherein fractionating the at least the portion of the effluent from the slurry hydrocracking zone in the fractionation zone into the at least two streams comprises fractionating the liquid stream from the second separator in the fractionation zone into the at least two streams.

7. The method of claim 1 further comprising adding make-up hydrogen to the hydrotreating zone.

8. The method of claim 1 wherein fractionating the at least the portion of the effluent from the slurry hydrocracking zone in the fractionation zone into the at least two streams comprises fractionating the at least the portion of the effluent from the slurry hydrocracking zone in the fractionation zone into at least a heavy vacuum gas oil stream and at least one additional stream and further comprising:
recycling the heavy vacuum gas oil stream to at least one of the slurry hydrocracking zone and the hydrotreating zone.

9. The method of claim 1 wherein fractionating the at least the portion of the effluent from the slurry hydrocracking zone in the fractionation zone into the at least two streams comprises fractionating the at least the portion of the effluent from the slurry hydrocracking zone in the fractionation zone into at least a pitch stream and at least one additional stream and further comprising:
separating the slurry hydrocracking catalyst from the pitch stream.

10. The method of claim 1 further comprising heating the bottoms liquid stream from the first separator before hydrocracking the bottoms liquid stream from the first separator in the slurry hydrocracking zone.

11. The method of claim 1 wherein fractionating the at least the portion of the effluent from the slurry hydrocracking zone in the fractionation zone into at least two streams comprises fractionating the at least the portion of the effluent from the slurry hydrocracking zone in the fractionation zone into at least a naphtha-diesel stream, a light vacuum gas oil stream, a heavy vacuum gas oil stream, and a pitch stream.

12. A slurry hydrocracking process comprising:
hydrotreating a fresh, heavy residual, asphaltene-containing hydrocarbon feed in a fixed bed reactor, hydrotreating zone under hydrotreating conditions including a temperature in a range of about 330° C. to about 440° C., a pressure of about 13 MPa to about 28 MPa, a liquid hourly space velocity of about 0.1 hr$^{-1}$ to about 2 hr$^{-1}$, and a gas to oil ratio of 4,000-10,000 SCFB to provide a conversion of 975+° F. hydrocarbons of from about 20 to about 50 wt % in the presence of a hydrotreating catalyst to hydrogenate multi-ring aromatics including asphaltenes and form a hydrotreated effluent, wherein the hydrotreating catalyst comprises at least one Group VIII metal selected from cobalt and nickel and at least one Group VI metal selected from molybdenum and tungsten on an alumina support;
separating the hydrotreated effluent in a first separator to form an overhead vapor stream and a bottoms liquid stream;
hydrocracking the bottoms liquid stream directly from the first separator in a slurry hydrocracking zone under slurry hydrocracking conditions including a temperature of about 432° C. (810° F.) to about 476° C. (890° F.) and a pressure in a range of about 10 MPa to about 25 MPa in the presence of a slurry hydrocracking catalyst;
fractionating at least a portion of the effluent from the slurry hydrocracking zone in a fractionation zone into at least two streams; and
wherein an overall conversion of 975+° F. hydrocarbons in the heavy residual, asphaltene-containing hydrocarbon feed is at least about 93%.

13. The method of claim 12 further comprising introducing make-up hydrogen to the hydrotreating zone.

14. The method of claim 12 wherein the first separator comprises at least a hot separator and a cold separator, and wherein separating the hydrotreated effluent in the first separator to form the overhead vapor stream and the bottoms liquid stream comprises separating the hydrotreated effluent in a hot separator to form the overhead vapor stream and the bottoms liquid stream, and further comprising:
separating the overhead vapor stream from the hot separator into a cold separator overhead stream and a liquid stream in a cold separator; and
at least one of:
introducing at least a portion of the cold separator overhead stream to the slurry hydrocracking zone;
recycling at least a portion of the cold separator overhead stream to the hydrotreating zone; and
fractionating the liquid stream from the cold separator in the fractionation zone.

15. The method of claim 12 further comprising:
separating the effluent from the slurry hydrocracking zone into a hydrogen rich gas stream and a liquid stream in a second separator;
recycling at least a portion of the hydrogen rich gas stream to the hydrotreating zone; and wherein fractionating the at least the portion of the effluent from the slurry hydrocracking zone in the fractionation zone into the at least two streams comprises fractionating the liquid stream from the second separator in the fractionation zone into the at least two streams.

16. The method of claim 12 further comprising heating the bottoms liquid stream from the first separator before hydrocracking the bottoms liquid stream from the first separator in the slurry hydrocracking zone.

17. The method of claim 12 wherein fractionating the at least the portion of the effluent from the slurry hydrocracking zone in the fractionation zone into the at least two streams comprises fractionating the at least the portion of the effluent from the slurry hydrocracking zone in the fractionation zone into at least a heavy vacuum gas oil stream and at least one additional stream and further comprising:

recycling the heavy vacuum gas oil stream to at least one of the slurry hydrocracking zone and the hydrotreating zone.

18. The method of claim 12 wherein fractionating the at least the portion of the effluent from the slurry hydrocracking zone in the fractionation zone into the at least two streams comprises fractionating the at least the portion of the effluent from the slurry hydrocracking zone in the fractionation zone into at least a pitch stream and at least one additional stream and further comprising:

separating the slurry hydrocracking catalyst from the pitch stream.

19. The method of claim 12 wherein fractionating the effluent from the slurry hydrocracking zone in a fractionation zone into at least two streams comprises fractionating the effluent from the slurry hydrocracking zone in a fractionation zone into at least a naphtha-diesel stream, a light vacuum gas oil stream, a heavy vacuum gas oil stream, and a pitch stream.

* * * * *